May 26, 1959    P. C. HOLLINSHEAD ET AL    2,887,778
CAVITY MEASURING INSTRUMENTS
Filed June 28, 1957
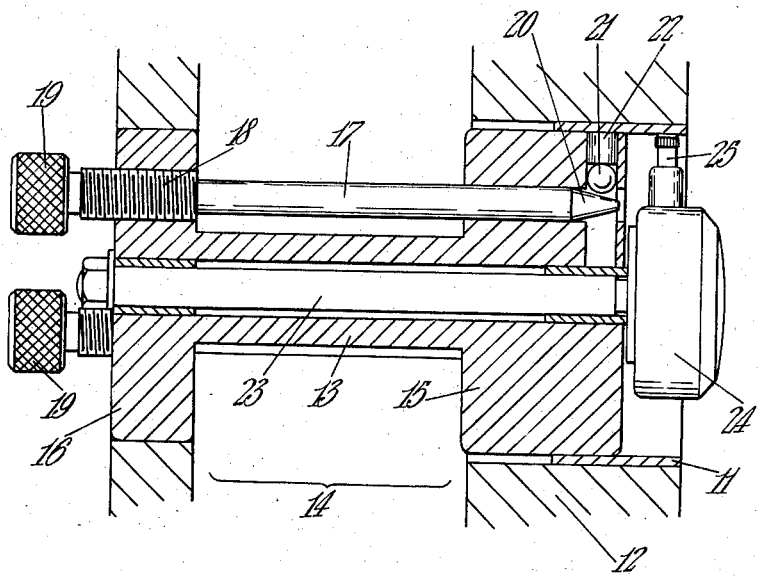
Inventors
Percy C. Hollinshead
Harold A. Clough
By Ralph B. Stewart
Attorney

United States Patent Office 2,887,778
Patented May 26, 1959

2,887,778

CAVITY MEASURING INSTRUMENTS

Percy C. Hollinshead, North Hykeham, and Harold A. Clough, Lincoln, England

Application June 28, 1957, Serial No. 668,694

Claims priority, application Great Britain October 2, 1956

3 Claims. (Cl. 33—178)

This invention relates to instruments for measuring or examining the inner periphery of a cavity; it is particularly well suited for the examination of a cylindrical bore intended as a journal to receive a rotary shaft, serving then to measure accurately the lengths of the radii from a given centre to any number of points on said periphery angularly spaced about a circle normal to the axis through the said centre.

An instrument in accordance with this invention will measure the roundness or otherwise of a bearing bore around a predetermined centre. It will show accurately the amount of deformation which can occur in a bearing-bore under the varying stresses caused by bolt tightening and the differing degree of "nip" between bearing shells and housings.

In accordance with one of the features of the invention a frame is adjustably positionable within the bore or other cavity being examined, and a feeler freely rotatable about a point fixed within said frame is movable outwardly and inwardly on a radius from said point to give a reading of the radial distance of a point on said feeler from said point.

In accordance with a further feature of the invention, the frame is adjustably positionable by three feet angularly spaced about the axis of rotation of the feeler and capable of fine adjustment radially to locate the frame relatively to the bore or cavity.

In accordance with yet another feature, the movement of the feeler is transmitted to a pointer moving over a dial wherefrom the desired reading can be taken.

The following description relates to the accompanying drawing which shows by way of example a section through only one embodiment of the invention.

As shown in the figure of the drawing the instrument is to be used to examine the inner periphery of a bearing liner 11 which is fitted within a bore in a bearing member 12.

The instrument consists of a body 13 in the form of a sleeve 14 with a stout head flange 15 and a rather thinner tail flange 16. Through the two flanges 15 and 16 extend three sets of bores parallel with the axis and equally spaced angularly around it. Each of the three bores in the head 15 meets a radial bore extending to the outer periphery, while each of the three bores in the tail is screw threaded. Each of the three sets of two bores, one in the tail and the other aligned with it in the head, receives an adjusting spindle 17. At the tail end the spindle has a screw-threaded portion 18 engaging in the tail bore, and a knurled knob 19 by which the spindle can be rotated and hence adjusted axially with respect to the body 13. At the head, the spindle has a tapered part 20 extending across the radial bore. In the radial bore is located an anti-friction ball 21 and beyond it is a fibre pad 22. By rotation of the knob 19, the spindle is displaced axially, and its tapered head 20 moves across the radial bore. Hence the instrument can be precisely located with respect to the liner 11 under examination.

Through the centre of the body 13 extends a bore within which is located a spindle 23 carrying at its forward end a dial indicator 24 having a feeler 25 spring-urged outwardly to engage the liner 11.

In use, the instrument is placed in a bore and the dial indicator button or feeler 25 engages the inner bearing surface. The three fibre pads 22 are then adjusted radially until the indicator dial shows zero when a reading is taken at a position with the feeler located centrally of each pad. The frame is then centered in a circle which is prescribed by the fibre pads. By moving the centre spindle around, readings can be taken at any position around the bearing. These readings will show any deviation from a true circle, the centre of which is the centre of the spindle 23.

Instead of an indicating instrument, a recorder (not shown) may be used to make a record or plot as the feeler moves angularly round the periphery of the cavity.

What we claim is:

1. An instrument for measuring or examining the inner periphery of a cavity comprising a frame adjustably positionable within the cavity, three feet on said frame angularly spaced about an axis and individually capable of fine adjustment radially of said axis to locate the frame within the cavity, a spindle associated with each foot arranged parallel with the axis within said frame and having a tapered end engaging the inward end of the foot so that upon axial movement of the spindle the foot is displaced radially and a feeler mounted on said frame so as to be freely rotatable about said axis and movable outwardly and inwardly on a radius from said axis to give a reading of the radial distance from said axis of a point on the periphery of the cavity contacted by said feeler.

2. An instrument as claimed in claim 1 having the inward and outward movement of said feeler transmitted to a pointer moving over a dial wherefrom the desired reading can be taken.

3. An instrument as claimed in claim 1 in which the axial movement of said spindles is effected by the use of screw threads.

References Cited in the file of this patent

UNITED STATES PATENTS

| | | |
|---|---|---|
| 1,403,156 | Genzalez | Jan. 10, 1922 |
| 2,531,317 | Baney et al. | Nov. 21, 1950 |
| 2,621,416 | Brenneke | Dec. 16, 1952 |
| 2,766,532 | Eisele | Oct. 16, 1956 |